Figure 1:
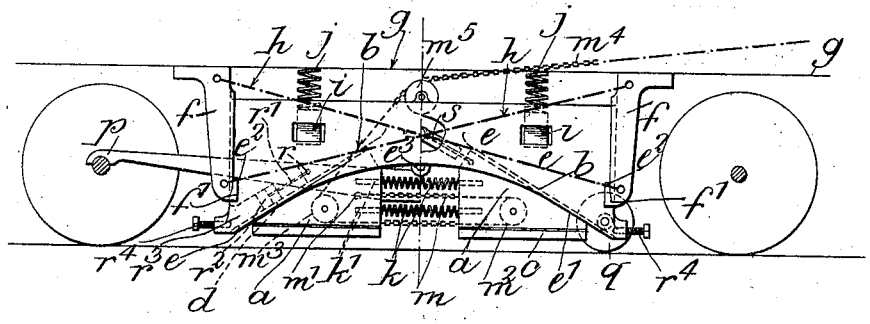

No. 886,997. PATENTED MAY 5, 1908.
W. LOVE.
FRICTIONAL BRAKE.
APPLICATION FILED JULY 8, 1907.

2 SHEETS—SHEET 1.

Witnesses. Inventor.

No. 886,997. PATENTED MAY 5, 1908.
W. LOVE.
FRICTIONAL BRAKE.
APPLICATION FILED JULY 8, 1907.

2 SHEETS—SHEET 2.

Witnesses
W Henry Simms
E. Clough

Inventor
W Love
per M Lyd Wise
Attorney.

UNITED STATES PATENT OFFICE.

WILLIAM LOVE, OF LONDON, ENGLAND.

FRICTIONAL BRAKE.

No. 886,997.   Specification of Letters Patent.   Patented May 5, 1908.

Application filed July 8, 1907. Serial No. 382,748.

*To all whom it may concern:*

Be it known that I, WILLIAM LOVE, a subject of the King of Great Britain and Ireland, residing at London, England, have invented Improvements in or Relating to Frictional Brakes, of which the following is a specification.

This invention relates to frictional brakes for use in general where it is desired to produce a retarding effect between two contacting surfaces of bodies one of which possesses motion of translation relatively to the other, but it is more particularly intended to be applied to track brakes of rail or road vehicles.
The objects of the invention are to provide a more efficient means whereby the brake shoe upon the relatively movable body, or each brake shoe, when released, is advanced into engagement with the required co-acting surface of the relatively stationary body; to insure that the brakes shall be automatically applied in the event of rupture of any of the connections of the brake rigging; to enable a similar automatic application of the brake to be effected at will from any desired point or points, and to employ devices whereby the rate of application of the brake can, when desired, be adjusted or determined to suit different requirements.
More specifically considered, in the application of the invention to road or rail vehicles the brake rigging is devised to cause the track brake shoes at both sides of the vehicle to be advanced into engagement with the road or rails through substantially equal distances and under substantially equal pressures.

The invention consists in forming or providing the brake shoe or each brake shoe with a wedge shaped portion or surface adapted to slide or be guided upon or against an inclined plane on a normally stationary though relatively moving block or support under the influence, in one direction, of any appropriate motive power such as a spring, weight, electro-magnetic device, screw and connection or other mechanical equivalent, and, in the opposite direction, of means comprising for instance a chain, flexible cord or wire which normally serves to hold the brake shoe in the released position and can be directly controlled by power or manually from a main operating point as well as, it may be, from one or more subsidiary points through the medium of a clutch or clutches and suitable connections. To regulate the rapidity with which the brake shoe is advanced toward the required surface when released, a controller may be used operating by preference under fluid pressure somewhat after the fashion it may be of a dash-pot which introduces a time element into the operation of the brake. When a plurality of brake shoes, suitably shod, are to be applied to the same or similar surfaces simultaneously and it is desired that the effect of each should be identical or approximately so at each side of the vehicle, the brake shoes are connected through the parts upon which they slide, for example brake blocks, to one or more equalizing bars arranged to act against the body of the vehicle, preferably through springs.

Figure 2:
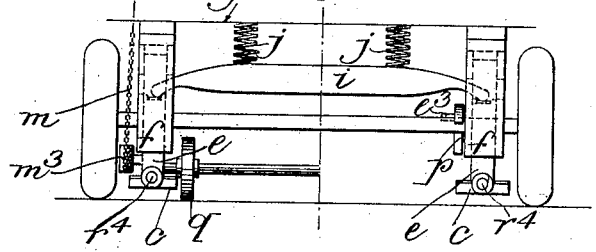
Figure 3:
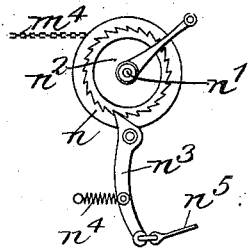
Figure 4:
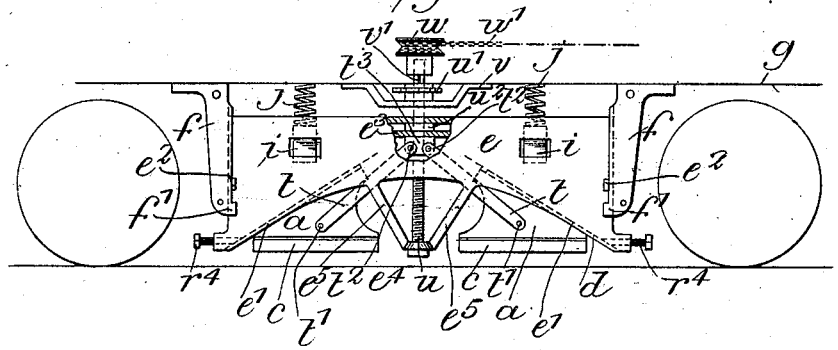
Figures 5, 6:
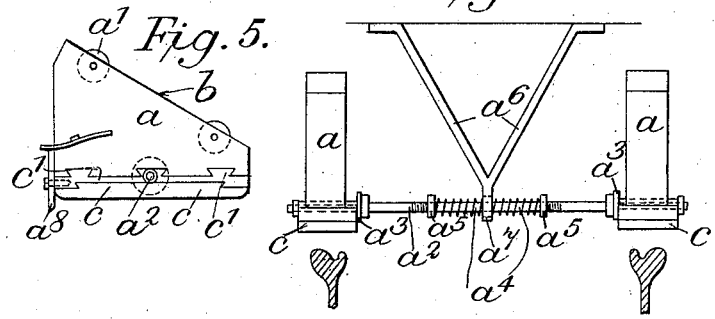
Figure 7:
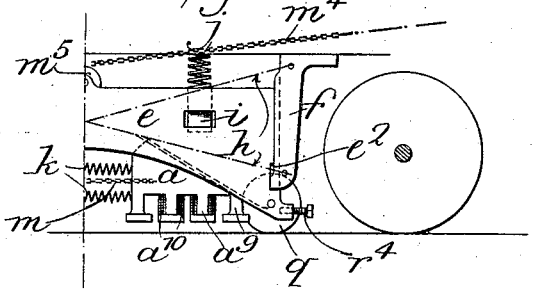

Examples of the manner of carrying out the invention in its application to a track brake for road or rail vehicles will now be described with reference to the accompanying drawings wherein Figure 1 is a side elevation, partly diagrammatic, of a vehicle and track brake showing, at the right hand side, one arrangement of certain details and, at the left hand side, another arrangement of such details. Fig. 2 is an end elevation, the left and right hand sides of which correspond with the right and left hand sides respectively of Fig. 1. Fig. 3 is a plan view of a device for use with the operating means shown in Fig. 1. Fig. 4 is a view similar to Fig. 1 of a modification, and Figs. 5 and 6 are respectively side and end elevations of brake shoes suitable for use in the arrangement according to Figs. 1 and 4. Fig. 7 shows an arrangement in which the brake shoes are applied to a metal track electro-magnetically.

According to Figs. 1 and 2 of the said drawings, a pair of brake shoes $a$ is employed at each side of the vehicle, the said shoes being each formed with an inclined upper surface $b$ and provided at the bottom with a detachable or renewable sole or wearing piece $c$ which may be formed of material, for example wood, possessing a high co-efficient of friction. The two shoes $a$ of each pair are undercut or otherwise suitably fashioned at $b$ so that they can slide upwards towards one another or downwards and away from one another within two correspondingly shaped and oppositely inclined grooves or recesses $d$ that are formed in the underside of a frame or carrier $e$, herein referred to as the brake-block $e$, and the faces $e^1$ of which constitute inclined planes. The brake block $e$ is arranged to move vertically in and between brackets $f$ that are directly secured to the vehicle frame $g$ and may be suitably strengthened, as by tie rods $h$. The two brake blocks $e$ at the respective sides of the vehicles are connected by one or more, in the present case two, equalizing bars $i$ between which and the lower side of the underframe $g$, or body of the vehicle, springs $j$ are interposed.

The two brake shoes $a$ of each pair are acted upon by interposed springs $k$ that tend to force them apart and down the inclined planes $e^1$ on the brake block $e$ and which may be carried by rods $k^1$ supported by the shoes. The two shoes $a$ of each pair are connected together by, in the present case, one chain $m$, or it might be more chains, which, or each of which, may be fixed at one end $m^1$ to one of the shoes $a$, be thence led over and under a sheave $m^2$ on the other shoe $a$, then under and over a sheave $m^3$ on the first shoe $a$ whence, as is obvious, the chain may again pass over another sheave co-axial with the sheave $m^2$ and over a sheave co-axial with the sheave $m^3$ and so on as often as may be required for the multiplication of the power applied to the chain which finally passes over the guide pulley $m^5$ on the brake block $e$ to a conveniently arranged winding drum or barrel such as the drum $n$ shown in Fig. 3. Conveniently, the chain $m$ leading from each pair of brake shoes $a$ is connected to a single chain $m^4$ to be wound upon and unwound from a single drum $n$.

The drum or barrel $n$, or each drum or barrel, or the shaft $n^1$ carrying it or them, is furnished with a ratchet wheel $n^2$ and detent or pawl $n^3$ capable of being disengaged against the action of a spring $n^4$ by the attendant at the main operating position, as for instance the driver or conductor, or, it may be, of being similarly disengaged by a passenger on the vehicle, by a pull applied to a line wire $n^5$ running throughout the length of the vehicle and leading to the said detent or pawl $n^3$. The arrangement is such that upon releasing or slackening the chain $m^4$, or chains $m$, the two brake shoes $a$ at each side of the vehicle will be forced downward by their interposed springs $k$ so as to apply the brake shoes $a$ to the rails or road over which the vehicle is traveling and thereby produce a braking action on the vehicle, the brake shoes $a$ being at the same time held between the road surface and the inclined planes $e^1$ after the manner of wedges independently of their springs. Upon winding up the chains $m^4$, or chains $m$, the brake shoes $a$ will be caused to ascend the inclined planes $e^1$ against the action of the said springs $k$ and so remove the brake.

In the case of a vehicle in which there is no relative movement between the axles of the carrying wheels and the frame $g$, it will suffice, to insure the maintenance of a minimum clearance between the brake block $e$, and consequently the brake shoes $a$, when in the release position, and the roadway, to provide the brake block $e$ with stops $e^2$ adapted to engage lugs or projections $f^1$ upon the brackets $f$.

By the construction described, when the brakes are applied by slackening the chain $m^4$, or chains $m$, to the required extent, that brake shoe $a$ which is rearmost with respect to the direction of travel of the vehicle will gradually advance along its inclined plane $e^1$ and lift the brake block $e$ against the influence of the springs $j$ to an extent which is variable with the load on the vehicle, with the speed of the latter, and with the angle which the inclined surfaces make with the horizontal. If the load be equally distributed transversely of the vehicle, the force exerted upon the brake shoes $a$ at opposite sides of the vehicle will be equal, or approximately so, but should the load be unevenly distributed transversely of the vehicle, the force which ordinarily would be greater on the brake shoes at the side more heavily loaded will be in part transmitted through the equalizing bars $i$ to the brake shoes $a$ at the opposite side, the springs $j$ being so located that they act as fulcra for each bar $i$, thus enabling a force applied at one end to be transmitted to the other end.

Where the body of the vehicle is carried from the axles by springs so that relative movement may take place between the vehicle body and axles, the minimum clearance between the brake block $e$ and the road or railway may be determined, as shown to the left of Fig. 1 and to the right of Fig. 2, by providing the said block $e$ with a central pin or projection $e^3$ adapted to bear upon a longitudinally disposed bar $p$ which rests upon the front and rear axles of the vehicle. It will be seen that in this case also the equalizing function of the bars $i$ obtains when the vehicle body becomes angularly displaced, due to unequal loading, irrespective of the general difference in level between the vehicle body and the road or railway due to differing resultant loads. As an alternative to the supporting bars $p$ for the brake blocks $e$, the latter may be furnished, as shown to the right of Fig. 1 and to the left of Fig. 2, at each end with a roller or wheel $q$ adapted to bear upon the roadway, the result being the same as last described.

The drawings illustrate a road vehicle but the only difference between the arrangements shown and those suitable for railway vehicles is that such of the brake parts as may be necessary are disposed in alinement with the rails. The springs $j$ which act upon the equalizing bar or bars $i$ also serve to prevent the transmission of undue shocks to the body of the vehicle.

Each brake shoe $a$ may, as shown to the left of Fig. 1, be arranged to be connected through a lug $r$ with one or more rods $r^1$; in the present case one, provided, or each provided, with a piston $r^2$ arranged to work within a cylindrical chamber $r^3$ carried at or near the bottom of the corresponding brake block $e$ and having, or each having, a suitable orifice and regulating device by means of which air contained within the chamber $r^3$ can be permitted to escape at a predetermined rate when the piston $r^2$ therein is forcibly moved outward and downward by the action of the descending brake shoe $a$, thereby enabling the brake to be applied gradually, the said chamber having a large air inlet valve to allow the prompt release of the brake. An alternative to this controlling device is shown to the right of Fig. 1 where the upper part of the brake shoe $a$ is connected to the piston of an ordinary dash pot $s$ connected to the upper part of the brake block $e$. Screws $r^4$ are or may be fitted to the brake block $e$ to limit the descent of the shoes $a$ therein so that the latter may not be overrun by the block $e$ or vehicle.

In the modified arrangement shown in Fig. 4, the two brake shoes $a$ on each side of the vehicle are caused to move up and down the inclined planes $e^1$ on the corresponding brake block $e$ by one or more pairs of links $t$ jointed at $t^1$ to the respective shoes and at $t^2$ to a head piece or nut $t^3$ screwed on a vertical shaft $u$ provided with a sprocket or other wheel $u^1$ or device, whereby it can be rotated in one or other direction to apply or remove the brake, the operating mechanism being adapted to actuate the two screw threaded shafts $u$ at the respective sides of the vehicle simultaneously. Each screw shaft $u$ has its lower end mounted in a bracket $e^4$ the bifurcated arms $e^5$ of which are connected to or formed as part of the brake block $e$, $u^2$ being a collar on the shaft located between two bracket plates $e^6$ in the brake block $e$ so that it will be seen the shaft will move in unison with the latter. The sprocket wheel $u^1$, or its equivalent, is carried by a bracket $v$ from the vehicle frame $g$, and since relative movement may occur between the block $e$ and the vehicle frame, the said wheel $u^1$ is arranged to drive the shaft $u$ through a key and keyway connection at $v^1$. A sprocket chain extends round the sprocket wheels $u^1$ of both shafts $u$ so that it serves to operate both shafts simultaneously, and it may be passed round one or more sprocket wheels so as to be capable of being operated from the driver's platform for instance. For the purpose of enabling the brakes to be applied automatically in the case of failure of the sprocket chain, or the like, or from any point at will, a drum $w$ upon each of the shafts $u$ may be utilized to wind up a chain $w^1$ against the influence of a tensile spring, or to directly wind up a volute spring, in the act of taking off the brakes, so that the screw will be rotated in a reverse direction when the positive operating mechanism is released or ruptured. Thus, if the driving wheel of the sprocket chain leading to the sprocket wheels $u^1$ be provided with a clutch member, the said wheel can be liberated independently of the operation of the main controlling handle, from any convenient part of the vehicle through appropriate connections in a manner equivalent to that already described with reference to the device illustrated in Fig. 3. In other respects the arrangement shown in Fig. 4 is similar to that first described. The pairs of brake blocks $e$ and shoes $a$ may be applied between the carrying or running wheels of the vehicle, as shown, or outside such wheels so as to be near the ends of the vehicle, as may be desired.

As shown in Figs. 5 and 6, the brake shoe $a$ may be furnished with antifriction rollers $a^1$ adapted to engage the surface of the inclined plane of the block $e$, and the sole $c$ may be fixed in a holder $c^1$ dovetailed to the shoe $a$, as indicated, so as to permit it to move sidewise on the shoe and accommodate itself to the railway on curves. The shoe holder $c^1$ at one side of the vehicle is connected to the shoe holder at the other side through a rod $a^2$ provided with stops $a^3$ for limiting the transverse movement of the sole $c$ and holder $c^1$. Normally, the shoe holders $c^1$ are held in the position indicated in Fig. 6 by springs $a^4$ abutting against collars $a^5$ on the rod $a^2$ and against opposite sides of a bracket $a^6$ the vertical depending extremity $a^7$ whereof is slotted to enable the rod $a^2$ to move axially and vertically therein. $a^8$ is a spring-advanced scraper mounted upon the holder $c^1$ for the purpose of clearing the rail of "grease" or other matter.

Fig. 7 shows an arrangement in which the brake shoes $a$ when released are advanced into contact with the rails electro-magnetically for which purpose each shoe is formed with polar projections $a^9$ adapted to be energized by magnetizing coils $a^{10}$ in any ordinary way. With this arrangement the frictional effect of the shoes, due to the load on the vehicle, and the inclined surfaces, can be augmented by the magnetic attraction between the shoes and the relatively moving contacting surface of the rail.

What I claim is:—

1. Frictional brakes for producing a retarding effect between bodies one of which is subject to a motion of translation with respect to the other, comprising wedge shaped brake shoes, inclined guideways for the same arranged on the moving body, means for normally maintaining disengagement between the shoes and the stationary body, and means for releasing the shoes and establishing engagement between said shoes and body.

2. Frictional brake apparatus for producing a retarding effect between bodies one of which is subject to a motion of translation with respect to the other, comprising wedge shaped brake shoes, inclined guideways for the same arranged on the moving body, means for normally maintaining disengagement between the shoes and the stationary body, and means operable from various points for permitting engagement to be established at will between said shoes and body.

3. Frictional brake apparatus for producing a retarding effect between bodies one of which is subject to a motion of translation with respect to the other, comprising wedge shaped brake shoes, inclined guideways for the same arranged on the moving body, means for normally maintaining disengagement between the shoes and the stationary body, and means for permitting engagement to be established therebetween automatically on rupture of the disengagement maintaining means.

4. Frictional brake apparatus for producing a retarding effect between bodies one of which is subject to a motion of translation with respect to the other, comprising wedge-shaped brake shoes, inclined guideways for the same arranged on the moving body, means for normally maintaining disengagement between the shoes and the stationary body, and means for liberating the shoes to enable them to automatically engage the stationary body with a frictional force variable with the momentum of the moving body.

5. Frictional brake apparatus for producing a retarding effect between bodies one of which is subject to a motion of translation with respect to the other, comprising wedge shaped brake shoes carried by the moving body, means for normally holding said shoes out of contact with the stationary body, and means for releasing and means for causing the shoes to engage the stationary body with a force variable with the momentum of the moving body.

6. Frictional brake apparatus for producing a retarding effect between bodies one of which is subject to a motion of translation with respect to the other, comprising oppositely movable wedge shaped brake shoes carried by the moving body, means for normally holding said shoes out of contact with the stationary body, and means for releasing and means for causing said shoes to advance simultaneously into engagement with the stationary body.

7. Frictional brake apparatus for producing a retarding effect between bodies one of which is subject to a motion of translation with respect to the other, comprising oppositely movable wedge shaped brake shoes carried by the moving body, means for normally holding said shoes out of contact with the stationary body, means for releasing said shoes simultaneously, and means for causing the same to advance into engagement with the stationary body so that the shoe which moves downward and rearward with respect to the direction of motion exerts a frictional drag varying in accordance with different running conditions.

8. Frictional brake apparatus for producing a retarding effect between bodies one of which is subject to a motion of translation with respect to the other, comprising oppositely movable wedge shaped brake shoes carried by the moving body, means for normally holding said shoes out of contact with the stationary body, means for permitting the same to be simultaneously released from any point at will, and means for causing the same to advance into engagement with the stationary body so that the shoe which moves downward and rearward with respect to the direction of motion exerts a frictional drag proportional to the momentum of the moving body.

9. Frictional brake apparatus for producing a retarding effect between bodies one of which is subject to a motion of translation with respect to the other, comprising wedge-shaped brake shoes, inclined guide ways for such shoes resiliently mounted upon the moving body, means for normally maintaining disengagement between the shoes and the stationary body, and means for liberating the shoes to enable them to automatically engage the stationary body with a frictional force variable with the momentum of the moving body.

10. Frictional brake apparatus for producing a retarding effect between bodies one of which is subject to a motion of translation with respect to the other, comprising wedge shaped brake shoes and inclined guide-ways for such shoes resiliently carried upon the moving body, means for normally maintaining disengagement between the shoes and the stationary body, and means for releasing the shoes and means for establishing engagement between them and said stationary body.

11. Frictional brake apparatus for producing a retarding effect between bodies one of which is subject to a motion of translation with respect to the other, comprising wedge shaped brake shoes and inclined guideways for such shoes resiliently mounted upon the moving body, means for normally maintaining disengagement between the shoes and the stationary body, and means operable from various points for releasing the shoes and establishing engagement between them and the stationary body.

12. Frictional brake apparatus for producing a retarding effect between bodies one of which is subject to a motion of translation with respect to the other, comprising wedge shaped brake shoes and inclined guideways for such shoes resiliently mounted upon the moving body, and means for normally maintaining disengagement between the shoes and the stationary body adapted to be brought into operation from any point at will and automatically on the rupture of such means.

13. Frictional brake apparatus for producing a retarding effect between bodies one of which is subject to a motion of translation with respect to the other, comprising wedge-shaped brake shoes, inclined guideways for the same arranged on the moving body, means for normally maintaining disengagement between the shoes and the stationary body, means for liberating the shoes to enable them to automatically engage the stationary body with a frictional force variable with the momentum of the moving body, and means for limiting the movement of said guideways towards the stationary body.

14. Frictional brake apparatus for producing a retarding effect between bodies one of which is subject to a motion of translation with respect to the other, comprising wedge shaped brake shoes, inclined guideways for such shoes resiliently mounted upon the moving body, and means for insuring that the shoes on application of the brake shall always advance through equal distances, measured vertically, before engaging the stationary body.

15. Frictional brake apparatus for a vehicle, comprising brake shoes arranged in oppositely movable pairs at each side of the vehicle, inclined guideways vertically movable upon the vehicle, means for normally maintaining the shoes in a position upon the guideways out of contact with the track, and means for causing the application of said shoes to the track.

16. Frictional brake apparatus for a vehicle, comprising brake shoes arranged in oppositely movable pairs at each side of the vehicle, inclined guideways vertically movable upon the vehicle, means for normally maintaining the shoes in a position upon the guideways out of contact with the track, and means operable from any point at will and automatically for permitting the shoes to advance into engagement with the track.

17. Frictional brake apparatus for a vehicle, comprising brake shoes arranged in oppositely movable pairs at each side of the vehicle, inclined guideways vertically movable upon the vehicle, means for normally maintaining constancy of position of such guideways with respect to the track, means for normally maintaining the shoes in a position upon the guideways out of contact with the track, and means operable from any point at will and automatically for permitting the shoes to advance into engagement with the track.

18. Frictional brake apparatus for a vehicle, comprising brake shoes arranged in oppositely movable pairs at each side of the vehicle, inclined guideways vertically movable upon the vehicle against springs acted on by the vehicle and means for equalizing the pressure exerted by the springs upon the guideways at opposite sides of the vehicle.

19. Frictional brake apparatus for a vehicle, comprising brake shoes arranged in oppositely movable pairs at each side of the vehicle, inclined guideways mounted in brackets upon the vehicle to permit of vertical movement between said guideways and brackets, means for normally maintaining the guideways at a constant height above the track, springs acted upon by the vehicle for exerting a pressure on the guideways in accordance with the load, and means for equalizing the pressure upon the guideways at opposite sides of the vehicle.

20. Frictional brake apparatus for a vehicle, comprising brake shoes arranged in oppositely movable pairs at each side of the vehicle, inclined guideways mounted in brackets upon the vehicle to permit of vertical movement of the vehicle with respect to the guideways, means for normally maintaining the guideways at a constant height above the track, springs acted upon by the vehicle for exerting a pressure on the guideways in accordance with the load, means for equalizing the pressure upon the guideways at opposite sides of the vehicle, means for normally maintaining the shoes in a position upon the guideways out of contact with the track, and means operable from any point at will and automatically for permitting the shoes to advance into engagement with the track.

21. In a vehicle brake, the combination with brake shoes adapted to exert a frictional drag upon the track under the action of inclined guideways in accordance with the momentum of the vehicle, of spring means for advancing the shoes from an inoperative position into engagement with the track, and means operable from any convenient point on the vehicle and automatically for permitting the said spring means to act.

22. In a vehicle brake, the combination with brake shoes adapted to exert a frictional drag upon the track under the action of inclined guideways upon the vehicle of transverse pressure equalizing bars engaging such guideways, and springs acting upon the equalizing bars at points intermediate of their ends and acted upon by the vehicle.

23. A railway vehicle brake, comprising oppositely movable wedge shaped brake shoes, a brake block having inclined guideways therefor, brackets secured to the vehicle for permitting relative vertical movement between the vehicle and brake block, means for normally maintaining the brake block at a constant height above the track, a flexible connection and means for normally maintaining the brake shoes in a position upon the block out of contact with the track, and spring means, controlled by the flexible connection and means aforesaid, for advancing said shoes into engagement with the track.

24. A railway vehicle brake comprising oppositely movable wedge shaped brake shoes, a brake block having inclined guideways therefor by which the same when released are advanced into engagement with the rails, and means for augmenting the frictional drag between such shoes and the rail.

25. A railway vehicle brake comprising oppositely movable wedge-shaped brake shoes, a brake block having inclined guideways therefor which is resiliently carried by the vehicle, and means for equalizing the pressure upon the brake shoes at opposite sides of the vehicle.

26. Frictional brake apparatus for producing a retarding effect between bodies one of which is subject to a motion of translation with respect to the other, comprising oppositely movable wedge-shaped brake shoes, a brake block having inclined guideways therefor, and means for limiting the movement of such shoes upon such block.

27. Frictional brake apparatus for producing a retarding effect between bodies one of which is subject to a motion of translation with respect to the other, comprising oppositely movable wedge-shaped brake shoes, a brake block having inclined guideways therefor, and means for adjusting the rate at which such shoes can move along such guideways.

28. Frictional brake apparatus for producing a retarding effect between bodies one of which is subject to a motion of translation with respect to the other, comprising oppositely movable wedge shaped brake shoes, a brake block having inclined guideways therefor, means for limiting the movement of such shoes upon such block, and means for adjusting the rate at which such shoes can move along such guideways.

29. A railway vehicle brake, comprising oppositely movable wedge-shaped brake shoes, a block having inclined guideways therefor, and soles upon said shoes adapted to move sidewise to accommodate curves on the line.

30. A railway vehicle brake comprising oppositely movable wedge shaped brake shoes, a brake block having inclined guideways in which said shoes are free to slide, bars carried by the axles of the vehicle for supporting the brake block, brackets secured to the vehicle to permit the latter to move vertically with respect to the brake block, a nut and screw with connections for advancing the shoes into engagement with the rails, a coiled spring for rotating the screw in one direction, and a flexible connection and winding means for rotating the nut in the opposite direction.

Signed at 42 Claremont Square London, E. C., this twenty-eighth day of June, 1907.

WILLIAM LOVE.

Witnesses:
AUBER CROWLE PEARSON.
GEORGE COCKERELL.